(12) United States Patent
Sudhakaran et al.

(10) Patent No.: US 12,074,877 B2
(45) Date of Patent: Aug. 27, 2024

(54) MANAGEMENT OF USER AUTHENTICATION BETWEEN ENTERPRISE-LEVEL AUTHENTICATION PROTOCOL AND CLOUD-NATIVE AUTHENTICATION PROTOCOL

(71) Applicant: Hewlett Packard Enterprise Development LP, Houston, TX (US)

(72) Inventors: Sonu Sudhakaran, Bangalore Karnataka (IN); Travis S. Tripp, Fort Collins, CO (US); Venkateswaran Tharuvai Sundaram, Fort Collins, CO (US); Surya Narayanaraju Penmetcha, Bangalore Karnataka (IN); Hardik Dhirendra Parekh, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 594 days.

(21) Appl. No.: 17/301,914

(22) Filed: Apr. 19, 2021

(65) Prior Publication Data
US 2022/0200998 A1  Jun. 23, 2022

(30) Foreign Application Priority Data
Dec. 17, 2020 (IN) ............................. 202041055044

(51) Int. Cl.
*H04L 9/40* (2022.01)
*H04L 67/306* (2022.01)

(52) U.S. Cl.
CPC .......... *H04L 63/102* (2013.01); *H04L 63/083* (2013.01); *H04L 63/104* (2013.01); *H04L 67/306* (2013.01)

(58) Field of Classification Search
CPC ................. H04L 63/102; H04L 63/083; H04L 63/104; H04L 67/306
(Continued)

(56) References Cited

U.S. PATENT DOCUMENTS 8,893,230 B2  11/2014 Oberheide et al.
9,641,512 B2   5/2017 Platt et al.
(Continued)

OTHER PUBLICATIONS

Citrix; "OAuth authentication"; Nov. 5, 2020; 4 pages.
(Continued)

*Primary Examiner* — Bryan Y Lee
(74) *Attorney, Agent, or Firm* — Hewlett Packard Enterprise Patent Department (57) ABSTRACT

Examples described herein relate to an authentication management system and a method for managing authentication of a user between an enterprise-level authentication protocol and a cloud-native authentication protocol. The authentication management system may receive an authentication request from an application hosted on a private on-premise network to authenticate a user using the enterprise-level authentication protocol. The authentication request is generated by the application upon receiving an access request from the user via a software as-a-service (SaaS) cloud platform in a cloud-native authentication protocol. Further, the authentication management system may generate an authentication response compliant with the enterprise-level authentication protocol based on an authentication reply that is formatted in compliance to the cloud-native authentication protocol and received from a cloud-native identity and authentication management system based on the authentication request. The authentication management system may then send the authentication response to the application.

20 Claims, 7 Drawing Sheets

(58) Field of Classification Search
USPC .............................................................. 726/4
See application file for complete search history.

(56) References Cited

U.S. PATENT DOCUMENTS

| | | | |
|---|---|---|---|
| 10,263,947 | B2 | 4/2019 | Vats et al. |
| 11,206,269 | B1* | 12/2021 | Van Deman ............ G06F 21/45 |
| 2018/0083915 | A1* | 3/2018 | Medam ............... G06F 16/2246 |
| 2020/0175404 | A1* | 6/2020 | Selvanayagam ....... G06N 20/00 |

OTHER PUBLICATIONS

Curatess, "LDAP OAuth2 Provider", Dec. 13, 2020, 9 pages, Retrieved from https://web.archive.org/web/20201213084858if_/https://github.com/Curatess/ldap-oauth2-provider/blob/master/LICENSE.

Lu. D., "Move LDAP Authentication to the Cloud with Okta's LDAP Interface", Okta Blog, Sep. 11, 2018, 6 pages, available at https://www.okta.com/blog/2018/09/move-ldap-authentication-to-the-cloud-with-oktas-ldap-interface/.

Multiple Authors, "Securing OAuth 2.0 Authorization server using LDAP authentication", stack overflow, Aug. 2017, 3 pages, available at https://stackoverflow.com/questions/45534816/securing-oauth-2-0-authorization-server-using-ldap-authentication.

Okta, "Automating Infrastructure Identity with Okta Advanced Server Access", retrieved on Apr. 16, 2021, 3 pages, retrieved from https://www.okta.com/sites/default/files/2020-07/Automating-Infrastructure%20Identity-with-Okta-Advanced-Server-Access.pdf.

Okta, "Automating Infrastructure Identity with Okta Advanced Server Access", Sep. 27, 2020, 7 pages, retrieved from https://web.archive.org/web/20200927045956/https://www.okta.com/resources/whitepaper/automating-infrastructure-identity-with-okta-advanced-server-access/.

Oracle; "Use Bridges to Integrate Oracle Identity Cloud Service with On-Premises Applications"; printed from webpage: https://docs.oracle.com/en/cloud/paas/identity-cloud/uaids/use-bridges-integrate-oracle-identity-cloud-service-premises-applications.html#GUID-F9EAA547-D229-463A-9403-FD826C1702C7; 2 pages.

Wikipedia, "OAuth", Nov. 22, 2020, 9 pages, retrieved from https://en.wikipedia.org/w/index.php?title=OAuth&oldid=990078813.

Okta, "Advanced Server Access", available online at <https://web.archive.org/web/20190402134359/https://www.okta.com/products/advanced-server-access/>, Apr. 2, 2019, 11 pages.

* cited by examiner

MANAGEMENT OF USER AUTHENTICATION BETWEEN ENTERPRISE-LEVEL AUTHENTICATION PROTOCOL AND CLOUD-NATIVE AUTHENTICATION PROTOCOL

BACKGROUND

Data may be stored on a private on-premise network (also referred to as a private cloud) or on a public cloud network, either having computing nodes, such as a server, a storage array, a cluster of servers, a computer appliance, a workstation, a storage system, a converged system, a hyperconverged system, or the like. In some examples, the data stored on the private on-premise network or on the public cloud network may be accessed via cloud based web-portals.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on an private on-premise network or on public cloud network having computing nodes, such as a server, a storage array, a cluster of servers, a computer appliance, a workstation, a storage system, a converged system, a hyperconverged system, or the like. The term on-premise may be understood to mean, for example, on location at premises (e.g., real estate, such as a data center) owned or operated by a user or organization or at a colocation center rented to the user or organization. In some examples, the data stored on the private on-premise network or on the public cloud network may be accessed via cloud based web-platforms. In some examples, certain cloud based portals may provide users a cloud-like experience by allowing management and/or usage of capabilities such as, for example, IT infrastructure and/or services offered by a private on-premise network, in a pay-per-use model.

Typically, users accessing the cloud based web-platforms may be authenticated via cloud-native identity and authentication management systems, which may be managed by an independent third-party company or a company managing the cloud based web-platforms in some examples. The identity and authentication management systems may manage users and group memberships of the users in a central database and may facilitate authentication and authorization of the users using cloud-native authentication protocols including, but not limited to, one or more of OAuth (e.g., OAuth 1.0 and OAuth 2.0) protocol, an OpenID Connect (OIDC) protocol, and the like. In contrast, typically, enterprise applications running on the private on-premise network may provide authentication using an enterprise-level authentication protocol, such as, but not limited to, Active Directory, Lightweight Directory Access Protocol (LDAP), or the Pluggable Authentication Module (PAM) authentication protocol. Generally, the Linux or directory-based tools are not a standard that may be used for cloud-native integrations. Moreover, the private on-premise network may support several enterprise applications which authenticate users using the enterprise-level authentication protocol. Accordingly, governing identity and access management centrally and extending support for LDAP over the internet for such multitude of enterprise applications may be challenging and difficult to maintain solution.

Therefore, in accordance with the aspects of the present disclosure, an authentication management system is presented that may bridge the authentication requests between the Linux directory tools (e.g., LDAP) and the cloud-native identity and authentication management system to provide enhanced security by supporting modern identity standards such as the OAuth or OIDC. In some examples, the use of the authentication management system may allow the identity and access management to be governed centrally for granting access to the enterprise applications hosted on the private on-premise network. In particular, the authentication management system may act as an authentication proxy bridge between enterprise-level authentication protocol (e.g., LDAP) and the cloud-native authentication protocol (e.g., OAuth 2.0) without need of altering the on-premise applications. Moreover, the techniques described herein may be useful in implementations where a user accesses an enterprise application (e.g., non cloud-native application) via a cloud-based portal in an as-a-Service consumption model.

In some examples, a user may attempt to access an on-premise application using the user's cloud-native access credentials and the on-premise application may send an authentication request compliant with the enterprise-level authentication protocol (e.g., LDAP) to the authentication management system. The authentication management system may translate such authentication request into an authentication relay request which is in a format in compliance to the cloud-native authentication protocol (e.g., OAuth 2.0 protocol) and send it to the cloud-native identity and authentication management system. Further, the authentication management system may convert an authentication reply received from the cloud-native identity and authentication management system and generate an authentication response compliant with the enterprise-level authentication protocol based on the authentication reply and send the authentication response to the on-premise application. Based on the authentication response received from the authentication management system, the on-premise application may allow or reject access by user.

As will be appreciated, use of the authentication management system may bridge authentication between the enterprise-level authentication protocol such as LDAP and the cloud-native authentication protocols such as OAuth or OIDC. Advantageously, this authentication bridging may be achieved without altering the on-premise applications. In particular, enterprise on-premise applications need not change authentication mechanism like LDAP protocol to work with cloud-native identity and authentication management systems. Moreover, use of the authentication management system, in some examples, may allow user identity management to remain centrally located in the cloud or in a software-as-a-service system controller (e.g., the SaaS cloud platform), but extends the authentication and authorization workflows for on-premise deployment (e.g., deployment of the on-premise application). Additionally, by virtue of the authentication management system described herein, cloud identity providers such as the cloud-native identity and authentication management system need not be backward compatible to enterprise-level authentication protocols, such as LDAP.

Figure 1:
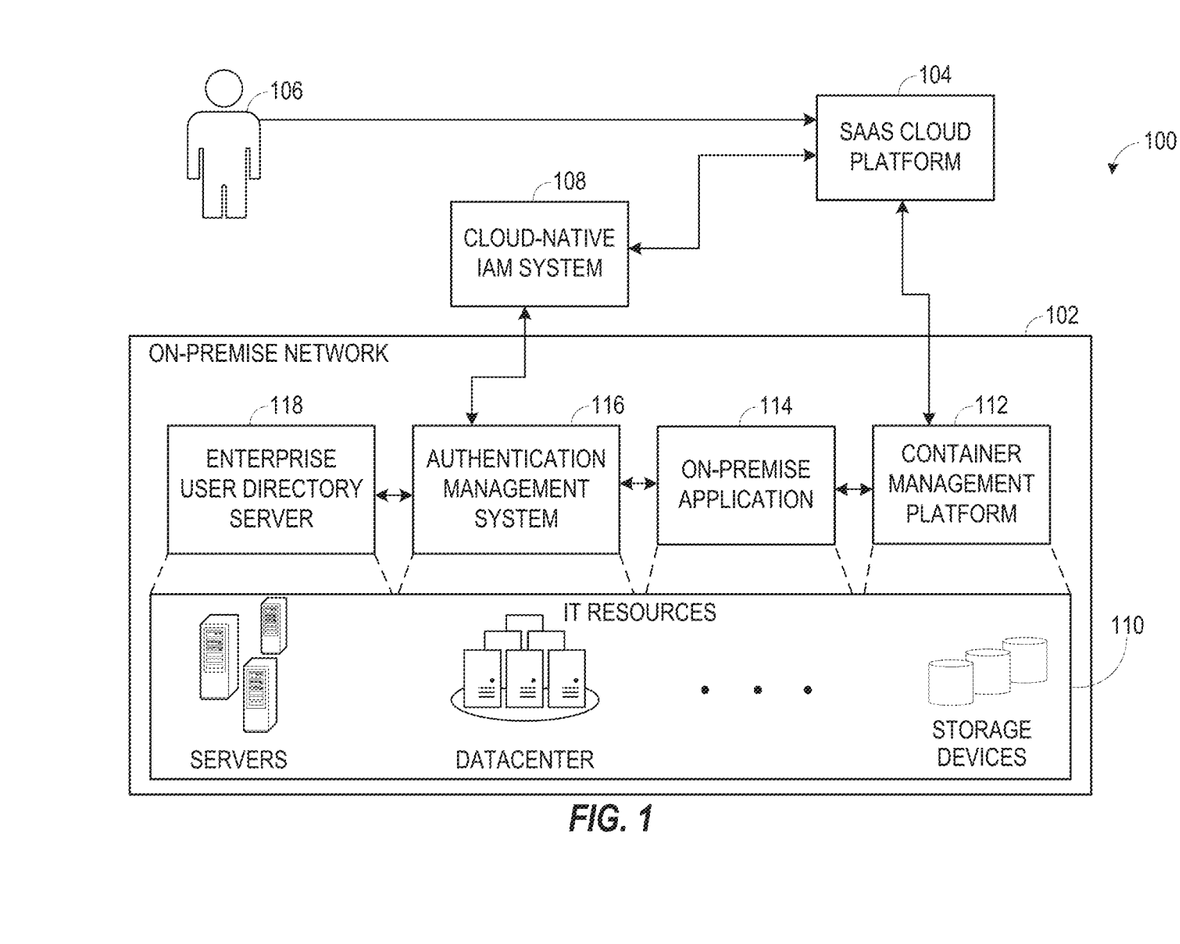
FIG. 1 depicts a networked system including a private on-premises network having an authentication management system, in accordance with an example.

Referring now to the drawings, in FIG. 1, a networked system 100 is presented, in accordance with an example. As depicted in FIG. 1, in some examples, the networked system 100 may include a private on-premise network 102 and a software-as-a-service (SaaS) cloud platform 104. The term private on-premise network 102 is referred to as an on-premise network. The SaaS cloud platform 104 may provide users (e.g., a user 106) of the SaaS cloud platform 104 a cloud-like experience by allowing management and/or usage of capabilities such as, for example, information technology (IT) infrastructure and/or services offered by the on-premise network 102 in a pay-per-use model.

As depicted in FIG. 1, the networked system 100 may also include a cloud-native identity and authentication management system 108 (hereinafter referred to as cloud-native IAM system 108) to facilitate secure access to the SaaS cloud platform 104. In some examples, the cloud-native IAM system 108 may be managed by an independent third-party company or a company managing the SaaS cloud platform 104. The cloud-native IAM system 108 may manage users and group memberships of the users in central database and may facilitate authentication and authorization of the users using cloud-native authentication protocols. Examples of the cloud-native authentication protocols supported by the cloud-native IAM system 108 may include, but are not limited to, one or more of OAuth (e.g., OAuth 1.0 and OAuth 2.0) protocol, Security Assertion Markup Language (SAML), an OpenID Connect (OIDC) protocol, and the like.

The cloud-native IAM system 108 may store a user entry corresponding to each registered user of the SaaS cloud platform 104. A user entry stored in the cloud-native IAM system 108 corresponding to a registered user such as the user 106 of the SaaS cloud platform 104 may include various attributes (hereinafter referred to as user attributes) about the user 106. Examples of the user attributes corresponding to the user 106 may include but are not limited to, one or more of a first name, a last name, a username, a primary email address, a secondary email address, a user group, a password, or a user status. An example user entry stored in the cloud-native IAM system 108 corresponding to the user 106 may be represented using following syntax (1).

Syntax (1): Example user entry in the cloud-native IAM system 108

```
{
  "First name": "Barbara",
  "Last name": "Jensen",
  "Username": "bjensen@example.com",
  "Primary email" "bjensen@example.com",
  "Secondary email": <optional email>
  "Groups": "admins"
  "Password" "Password"
  "Status": "ACTIVE"
}
```

The user attributes such as the username (e.g., "bjensen@example.com') and the password (e.g., "Password") of the user 106 managed by the cloud-native IAM system 108 may be referred to as cloud-native access credentials with which the user 106 can access the SaaS cloud platform 104 once the user is authenticated by the cloud-native IAM system 108 using the cloud-native authentication protocol. The user 106 may access the SaaS cloud platform 104 on any device including but not limited to a personal computer, a portable or handheld computing device (e.g., a laptop, a smartphone, personal digital assistant, and the like), via a web browser (e.g., in the form of a web portal) or an integrated application. Depending on a subscription held by the user 106, the user 106 may be able to access some of all capabilities offered by the SaaS cloud platform 104.

The on-premise network 102 may be a network of IT resources 110 hosted within premises of a customer-organization. Examples of the IT resources 110 hosted in the on-premise network 102 may include, but are not limited to, servers, storage devices, network switches, routers, mobile communication devices, desktop computers, portable computers, computing system resource enclosures, data centers, or WLAN access points (some of which are depicted in FIG. 1). The servers may be blade servers, for example. The storage devices may be storage blades or storage arrays, for example. Further, in some examples, the computing system enclosures may be a blade enclosure housing one or more blades (e.g., blade servers, storage blades, etc.). One or more of the IT resources 110 may allow applications (e.g., an application 114) and/or application management platforms (e.g., a container management platform 112) to run thereon. Such applications running on the IT resources 110 of the on-premise network 102 are also alternatively referred as on-premise applications. Further, in some examples, application management platforms running on the IT resources 110 of the on-premise network 102 are hereinafter referred to as on-premise application management platforms. Also, data stored in the one or more of the IT resources 110 (e.g., storage devices and data centers) is hereinafter referred as an on-premise data. Moreover, services offered by the on-premise applications are hereinafter referred to as on-premise services.

In some examples, the on-premise network 102 may either be managed by the customer-organization owning the on-premise network 102 itself or a third-party organization via a management platform such as the SaaS cloud platform 104. In particular, the management and/or consumption of the IT resources 110, the on-premise application management platforms, and the on-premise applications, the on-premise data, and the on-premise services may be facilitated in a cloud like manner via the SaaS cloud platform 104 to authorized users of the SaaS cloud platform 104 and the on-premise network 102 everywhere one needs. In some examples, the SaaS cloud platform 104 may enable management and/or consumption of such capabilities of the on-premise network 102 as-a-service in a pay-per-use model at the edge, in colocations, and in a data center. Using the SaaS cloud platform 104, users of an organization can use the on-premise applications hosted on the on-premise network 102, rapidly deploy the on-premise services, gain cost and compliance insights, and simplify management across of IT infrastructure of the on-premise network 102. Various examples of the on-premise services and/or public cloud services managed by the SaaS cloud platform 104, in the pay-per-use model, may include, but are not limited to, containers, virtual machines, bare metal, machine learning, database platform, private cloud, SAP HANA® produced by SAP SE, data protection, networking, storage, compute, and high-performance compute. A user may run various workloads using the foregoing example services.

In the example implementation of the on-premise network 102 depicted in FIG. 1, the on-premise network 102 is shown to host an application management platform, for example, a container management platform 112. In some examples, the container management platform 112 and/or services offered by on-premise applications running on the container management platform 112 may be used by an authorized user as a service in a pay-per-use model. The container management platform 112 may provide flexibility to deploy and manage containerized applications at scale on any infrastructure, for example, on one or more of the IT resources 110, colocation facilities, multiple public clouds, and at the edge. Further, an authorized user of the container management platform 112 can run cloud-native or non-cloud-native applications in containers without costly refactoring, manage multiple container clusters with a unified control plane, and leverage a high-performance distributed file system for persistent data and stateful applications as a service via the SaaS cloud platform 104 in a pay-per-use model. In an example the container management platform 112 may include the Kubernetes orchestration system.

The on-premise application 114 may represent software that may be managed as a containerized application via the container management platform 112. The on-premise application 114 that is hosted on the on-premise network 102 is hereinafter alternatively referred to as an on-premise application 114. It is to be noted that the present disclosure is not limited to a particular type of the on-premise application 114, a use of the on-premise application 114, functionalities, and/or features offered by the on-premise application 114. For the purpose of illustration, the on-premise application 114 is described as being a machine learning (ML) application than can be used by an authorized user in a pay-per-use model. By way of example, the ML application may allow the authorized user of the container management platform 112 to perform various ML operations, including, but not limited to, building, training, deploying, monitoring of one or more ML models.

Typically, enterprise applications running on the on-premise network 102 provide authentication using an enterprise-level authentication protocol, such as, but not limited to, Active Directory, the Lightweight Directory Access Protocol (LDAP) or the Pluggable Authentication Module (PAM) authentication protocol. In the example implementation of FIG. 1 as well, the on-premise application 114 may be one such enterprise application that is designed to allow access to a given user (e.g., the user 106) using the enterprise-level authentication protocol such as LDAP or PAM. For illustration purposes, the on-premise application 114 is described as an application that may allow access to the given user using LDAP. Generally, the Linux or directory-based tools are not a standard that may be used for cloud-native integrations. Moreover, the on-premise network 102 may support several enterprise applications which authenticate users using the enterprise-level authentication protocol. Accordingly, in traditional implementations, governing an identity and access management centrally using systems like SaaS cloud platform 104 and/or cloud-native IAM system 108 and extending support for LDAP over the internet for such multitude of enterprise applications may be challenging and difficult to maintain solution.

Therefore, in accordance with the aspects of the present disclosure, an authentication management system 116 is presented that may bridge the authentication requests between the Linux directory tools (e.g., LDAP) and the cloud-native IAM system 108 to provide enhanced security by supporting modern identity standards such as the OAuth or OIDC. Structural and/or implementation details regarding the authentication management system 116 are described in conjunction with FIG. 3. In some examples, the use of the authentication management system 116 may allow the identity and access management to be governed centrally for granting access to the enterprise applications hosted on the on-premise network 102. In particular, the authentication management system 116 may act as an authentication proxy bridge between enterprise-level authentication protocol (e.g., LDAP) and the cloud-native authentication protocol (e.g., OAuth 2.0) without need of altering the on-premise applications (e.g., the on-premise application 114).

In some examples, the authentication management system 116 may act as an interface between the on-premise application 114, the cloud-native IAM system 108 and an enterprise user directory server 118. The enterprise user directory server 118 may store one or more user entries including attributes and access permissions corresponding to users of an organization in a structured manner in compliance to enterprise-level authentication protocol, such as, LDAP, for example. In some examples, attributes corresponding to each user entry stored in the enterprise user directory server 118 may include one or more domain components (dc) related to the organization, an organization unit (e.g., production unit, human resources unit, sales unit, etc.) corresponding to the user entry (ou), a common name of the user (e.g., username or a group name), and the like. The user entries may have corresponding access permissions to access one or more on-premise applications depending on one or more of the respective organization unit or common name, in some examples. During operation, the enterprise user directory server 118 may receive one or more requests (e.g., ldapsearch) from the authentication management system 116 and may return a search result message including one or more matching user entries, if any, to the authentication management system 116 (described later).

Figure 2:
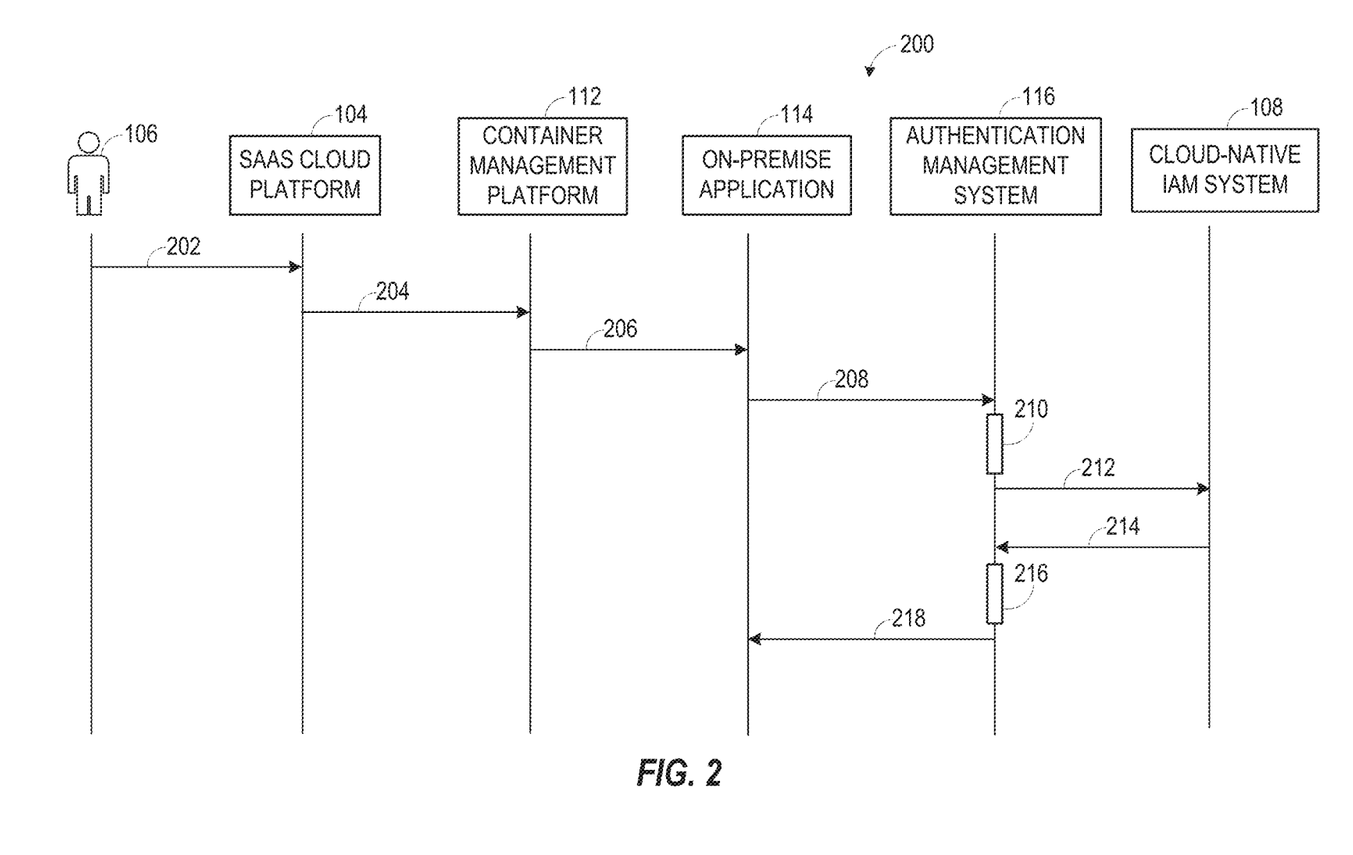
FIG. 2 depicts a sequence diagram illustrating a sequence of operations performed in the networked system of FIG. 1 to manage authentication of a user, in accordance with an example.

In some examples, the user 106 may attempt to access the on-premise application 114 using the user's cloud-native access credentials and the on-premise application 114 may send an authentication request that is compliant with the enterprise-level authentication protocol (e.g., LDAP) to the authentication management system 116. The authentication management system 116 may translate such authentication request into an authentication relay request which is in a format compliant with the cloud-native authentication protocol (e.g., OAuth 2.0 protocol) and send it to the cloud-native IAM system 108. Further, the authentication management system 116 may convert an authentication reply received from the cloud-native IAM system 108 and generate an authentication response compliant with the enterprise-level authentication protocol based on the authentication reply and return the authentication response to the on-premise application 114. Based on the authentication response received from the authentication management system 116, the on-premise application 114 may allow or reject user access. More details regarding a sequence of operations performed in the networked system 100 for managing an authentication of a user (e.g., the user 106) are illustrated with help of a sequence diagram 200, in accordance with an example.

As depicted in FIG. 2, at sequence 202, the user 106 may log into the SaaS cloud platform 104 using the user's cloud-native access credentials (e.g., a username and a password) that are synchronized with the cloud-native IAM system 108. If the cloud-native access credentials are verified to be correct, the user 106 is authenticated and will be allowed access to the SaaS cloud platform 104. Further, at sequence 204, the user 106 may access, from the SaaS cloud platform 104, the container management platform 112 hosted on the on-premise network 102 via a single-sign-on (SSO) based authentication of the cloud-native access credentials.

Further, in some examples, at sequence 206, the user 106 may attempt to access the on-premise application 114 which may be accessible using an enterprise-level authentication protocol (e.g., LDAP) and may require the user 106 to be authenticated in compliance to enterprise-level authentication protocol. Accordingly, the user 106 may input his/her cloud-native access credentials to access the on-premise application 114. For example, the user may input his/her username and password (e.g., username "bjensen@example.com" and password "password" from the syntax (1) example above). In a traditional approach, if the user 106 is to be authenticated solely via the enterprise-level authentication protocol, the authentication may fail if a user entry in compliance to the enterprise-level authentication protocol corresponding to the user 106 is not present in an enterprise user directory server. In accordance with the aspects of the present disclosure, the on-premise network 102 is equipped with the authentication management system 116 to manage authentication of a user (e.g., the user 106) who wants to access the on-premise application using cloud-native access credentials.

Accordingly, in some examples, at sequence 208, the on-premise application 114 may forward an authentication request that is compliant with the enterprise-level authentication protocol (e.g., LDAP) to the authentication management system 116. An example authentication request to authenticate the user 106 with the username "bjensen@example.com" using LDAP may be represented using following syntax (2).

| Syntax (2): Example authentication request as per LDAP |
| --- |
| LDAPTLS_REQCERT=never ldapsearch -o ldif-wrap=no -x -H ldaps://<Authentication Management System IP>:10389 -D 'uid=bjensen@example.com,cn=admin,dc=example,dc=com' -w 'password' -b 'uid=bjensen@example.com,ou=people,dc=example,dc=com' |

In particular, the on-premise application 114 may carry out the access attempt by the user 106 using LDAP and creates the above mentioned authentication request targeted to an IP address of the authentication management system 116 and including the cloud-native access credential username (e.g., "bjensen@example.com") as the common name (cn) field. Accordingly, in some examples, the on-premise application 114 may be configured to store or at least be aware of the IP address of the authentication management system 116, so that the on-premise application 114 can form the authentication request including the IP address of the authentication management system 116 in a field "<Authentication Management System IP>" (see syntax (2)). With this minor configuration of the on-premise application 114, the on-premise application 114 is able to send the authentication requests to the authentication management system 116 without requiring any modification of a primary program code of the on-premise application 114. Further, in the syntax (2), a field "w" may represent a binding password, a value of which may represent the password of the user 106 submitted to the on-premise application 114 (i.e., the cloud-native access credential password). Accordingly, the authentication request may be received by the authentication management system 116.

Furthermore, in some examples, at sequence 210, the authentication management system 116 may generate an authentication relay request based on the authentication request. The authentication relay request is formatted in compliance to the cloud-native authentication protocol (e.g., the OAuth protocol). For the purpose of illustration, in the description hereinafter, the cloud-native authentication protocol is described as being the OAuth protocol (e.g., OAuth 2.0) in various examples. However, in some other examples, the cloud-native authentication protocol may be any of an OAuth 1.0a, OAuth 2.0, an OIDC, without limiting the scope of the present disclosure. An example authentication relay request formatted in compliance to the OAuth 2.0 protocol generated based on the authentication request received from the on-premise application 114 may be represented using following syntax (3).

---

Syntax (3): Example authentication relay request as per OAuth 2.0

---

```
{
"grant_type":"password",
"client_id":"<EQE9PPuXc>", # OAuth Client App ID which
will be used to authenticate all users
"username":"bjensen@example.com",
"password": "password",
"client_secret":"<e58684445fc9f9951cb9a0d421>", # OAuth
Client App secret which will be used to authenticate all users
}
```

---

As depicted in the example syntax (3) of the authentication relay request formatted in compliance to the OAuth 2.0, the authentication management system 116 may include parameters such as client_ID (value=EQE9PPuXc) being an identifier of the on-premise application 114 and a client_secret (value=e58684445fc9f9951cb9a0d421) shared between the cloud-native IAM system 108 and the authentication management system 116 in addition to the username and the password of the user 106. Additional details regarding a method of generating the authentication relay request will be described in conjunction with FIG. 5. The authentication management system 116 may send the authentication relay request to the cloud-native IAM system 108 at sequence 212.

Moreover, at sequence 214, the authentication management system 116 may receive an authentication reply that is compliant with the cloud-native authentication protocol from the cloud-native IAM system 108. The authentication reply may indicate a successful authentication of the user 106 or an unsuccessful authentication of the user 106 using the cloud-native authentication protocol and authentication policies implemented by the cloud-native IAM system 108 in response to processing of the authentication relay request. In some examples, a successful authentication of the user 106 compliant with the OAuth 2.0 may include a status code "HTTP/1.1 200." Further, in some examples, an unsuccessful authentication of the user 106 compliant with the OAuth 2.0 may include a status code "HTTP/1.1 400" or "HTTP/1.1 401." In some examples, an error code may also be included in the authentication reply received from the cloud-native IAM system 108. The error code may include one or more of "invalid_request," "invalid_client," "invalid_grant," "invalid_scope," "unauthorized_client," or "unsupported_grant_type."

In some examples, the error code—"invalid_request" may be returned if the authentication relay request is missing a parameter, includes an unsupported parameter, or repeats the parameter. In some examples, the error code—"invalid_client" may be returned if the authentication relay request includes an invalid client ID or a secret and the status code "HTTP/1.1 401" may be included in the authentication reply. Further, in some examples, the error code—"invalid_grant" may be returned if an authorization code and/or user's password for the password grant type is invalid or expired. Also, in some examples, the error code—"invalid_scope" may be returned if access token requests include invalid scope (password or client_credentials grants). The error code—"unauthorized_client" may be returned if a client (e.g., the cloud-native IAM system 108) is not authorized to use the requested grant type. Further, the error code—"unsupported_grant_type" may be returned if a grant type requested is not recognized by the cloud-native IAM system 108.

An example authentication reply sent by the cloud-native IAM system 108 compliant with the OAuth 2.0 protocol indicating a successful user authentication may be represented using following syntax (4).

---

Syntax (4): Example successful authentication reply as per OAuth 2.0

---

```
HTTP/1.1 200 OK
    Content-Type: application/json;charset=UTF-8
    Cache-Control: no-store
    Pragma: no-cache
    {
        "access_token":"2YotnFZFEjr1zCsicMWpAA",
        "token_type":"example",
        "expires_in":3600,
        "refresh_token":"tGzv3JOkF0XG5Qx2TlKWIA",
        "example_parameter":"example_value"
    }
```

---

As depicted in the above mentioned syntax (4) of the authentication reply (e.g., indicating successful authentication), the authentication reply includes a status code "HTTP/1.1 200" which indicates that the user 106 is successfully authenticated. Additionally, in some examples, the authentication reply may include, amongst other data, details of the access token, token type, and expiry time.

Additionally, in some examples, the authentication reply sent by the cloud-native IAM system 108 compliant with the OAuth 2.0 protocol indicating an unsuccessful/failed user authentication may be represented using following syntax (5).

---

Syntax (5): Example unsuccessful authentication reply as per OAuth 2.0

---

```
HTTP/1.1 400 Bad Request
Content-Type: application/json;charset=UTF-8
Cache-Control: no-store
    Pragma: no-cache
    {
        "error": "invalid_request",
        "error_description": "Request was missing the 'redirect_uri'
parameter.",
        "error_uri": "See the full API docs at https://abc-
server.com/docs/access_token"
    }
```

---

As depicted in the above mentioned syntax (5) of the authentication reply (e.g., indicating failed authentication), a status code "HTTP/1.1 400" is present that indicates that authentication of the user 106 has failed. Additionally, the authentication reply includes, amongst other data, details of an error code (e.g., invalid_request) and an error description.

Once the authentication reply is received by the authentication management system 116, at sequence 216, the authentication management system 116 may generate an authentication response in compliance to the enterprise-level authentication protocol based on the authentication reply received from the cloud-native IAM system 108. Details of a method to generate the authentication response by the authentication management system 116 are described in detail on conjunction with FIG. 6. In one example, the authentication response generated by the authentication management system 116 compliant with LDAP for the successful user authentication reply may be represented using following syntax (6).

---
Syntax (6): Example authentication response as per LDAP
---
\# extended LDIF
\# LDAPv3
\# base <ou=people,dc=example,dc=com> with scope sub tree
\# filter: cn=bjensen@example.com
\# requesting: ALL
\# bjensen@example.com, people, example.com
dn:
uid=bjensen@example.com,ou=people,dc=example,dc=com
objectClass: posixAccount
objectClass: shadowAccount
objectClass: inetOrgPerson
cn: bjensen@example.com
sn: bjensen@example.com
uid:bjensen@example.com
uidNumber: 4590
gidNumber: 4590
homeDirectory: /home/bjensen@example.com
loginShell: /bin/bash
mail: bjensen@example.com
\# search result
search: 2
result: 0 Success
\# numResponses: 2
\# numEntries: 1

---

The authentication response compliant with LDAP as depicted in syntax (6) indicates that one user entry (see field "#numEntries") is identified matching a filter (e.g., #filter: cn=bjensen@example.com). In particular, a user having uid and cn being bjensen@example.com (e.g., the user 106) is successfully (see text "Success" in syntax (6)) identified in the enterprise user directory server 118. In some examples, such successful identification of a user having cn equal to bjensen@example.com in the authentication response may indicate that the user 106 is authenticated to access the on-premise application 114.

At sequence 218, the authentication management system 116 may send the authentication response which is compliant with the enterprise-level authentication protocol to the on-premise application 114. As indicated in the authentication response of syntax (6), the on-premise application 114 may provide access to the user 106, and the user 106 may then access functionalities offered by the on-premise application 114.

As will be appreciated, use of the authentication management 116 as described hereinabove may facilitate several advantages. For example, use of the authentication management system 116 may bridge authentication between the enterprise-level authentication protocol such as LDAP and the cloud-native authentication protocols such as OAuth or OIDC. Advantageously, this authentication bridging may be achieved without altering the on-premise applications (e.g., the on-premise application 114). In particular, the on-premise applications need not change their authentication mechanism, like LDAP, to work with cloud-native identity and authentication management systems.

Moreover, use of the authentication management system 116, in some examples, may allow user identity management to remain centrally located in the cloud or in a software-as-a-service system or controller (e.g., SaaS cloud platform 104), but extends the authentication and authorization workflows for on-premise deployment (e.g., deployment of on-premise application 114). Additionally, cloud Identity providers such as the cloud-native IAM system 108 not need be backward compatible to enterprise-level authentication protocols, such as LDAP.

Figure 3:
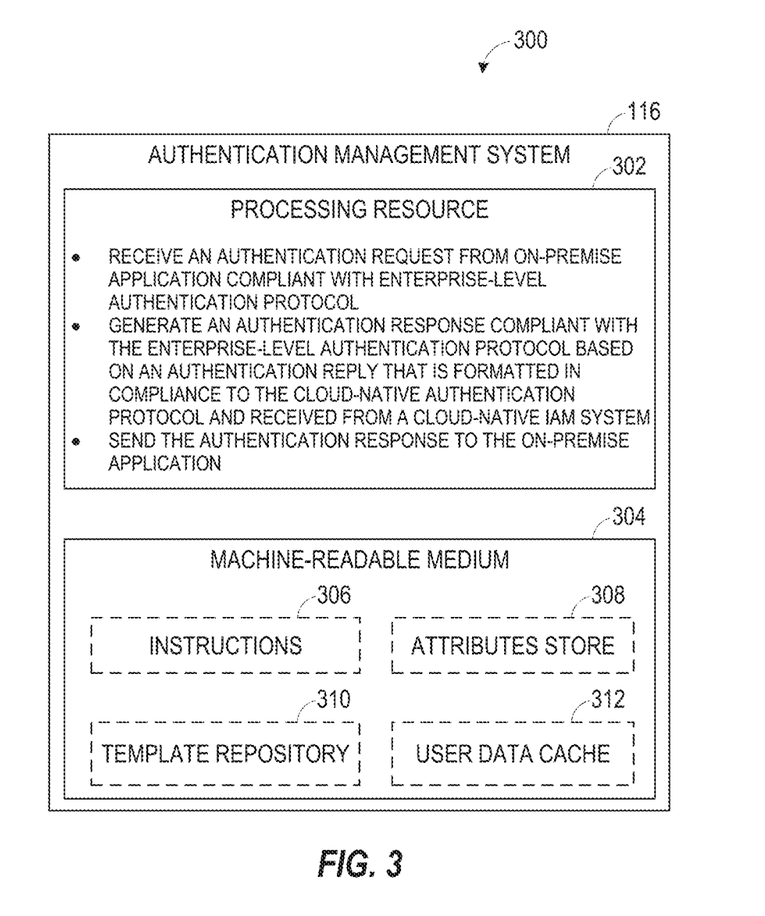
FIG. 3 depicts a block diagram of an authentication management system deployed in the private on-premises network of FIG. 1, in accordance with an example.

FIG. 3 is a block diagram 300 depicting an authentication management system 116 deployed in the private on-premise network of FIG. 1, in accordance with an example. In some examples, the authentication management system 116 may be a processor-based system that performs various operations intended to manage the authentication of the user 106 in the networked system 100 of FIG. 1. As depicted in FIG. 1, in some examples, the authentication management system 116 may be a device including a processor or microcontroller and/or any other electronic component, or a device or system that may facilitate various compute, data storage, and/or data processing, for example. Examples of the authentication management system 116 may include, but are not limited to, a desktop computer, a laptop, a smartphone, a server, a computer appliance, a workstation, a storage system, or a converged or hyperconverged system, and the like that is configured to manage authentication of the user 106 for accessing the on-premise application 114. Further, in certain examples, the authentication management system 116 may be a virtual machine or a containerized application executing on one or more of the IT resources 110 hosted in the on-premise network 102. In some examples, the authentication management system 116 may be deployed outside the on-premise network 102, without limiting the scope of the present disclosure.

In some examples, the authentication management system 116 may include a processing resource 302 and a machine-readable medium 304. The machine-readable medium 304 may be any electronic, magnetic, optical, or other i.o physical storage device that may store data and/or executable instructions 306. For example, the machine-readable medium 304 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 304 may be non-transitory. As described in detail herein, the machine-readable medium 304 may be encoded with the executable instructions 306 to perform one or more methods, for example, methods described in FIGS. 4-6.

Further, the processing resource 302 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 306 stored in the machine-readable medium 304, or combinations thereof. The processing resource 302 may fetch, decode, and execute the instructions 306 stored in the machine-readable medium 304 to manage authentication of the user 106. As an alternative or in addition to executing the instructions 306, the processing resource 302 may include at least one integrated circuit (IC), control logic, electronic circuits, or combinations thereof that include a number of electronic components for performing the functionalities intended to be performed by the authentication management system 116. Moreover, in certain examples, where the authentication management system 116 is implemented as a virtual machine or a containerized application, the processing resource 302 and the machine-readable medium 304 may represent a processing resource and a machine-readable medium of a hardware or a computing system that hosts the authentication management system 116 as the virtual machine or the containerized application.

In some examples, the user 106 may attempt to access the on-premise application 114 using the user's cloud-native access credentials. The processing resource 302 may execute one or more of the instructions 306 to receive an authentication request from the on-premise application 114 to authenticate the user 106 using the enterprise-level authentication protocol (e.g., LDAP). The authentication request is generated by the on-premise application 114 upon receiving an access request from the user via SaaS cloud platform 104 in the cloud-native authentication protocol (e.g., OAuth 2.0). Further, the processing resource 302 may execute one or more of the instructions to generate an authentication response compliant with the enterprise-level authentication protocol, where the authentication response is based on an authentication reply received from a cloud-native IAM system 108 that evaluated the authentication request. The authentication response may be compliant with the cloud-native authentication protocol.

Moreover, the processing resource 302 may execute one or more of the instructions 306 to send the authentication response to the on-premise application 114. Based on the authentication response received from the authentication management system 116, the on-premise application 114 may allow or reject access by the user. More details regarding the operations performed by the processing resource 302 by executing one or more of the instructions 306 for managing an authentication of the user 106 are described in conjunction with methods of FIGS. 4-6.

In some examples, the machine-readable medium 304 may include one or more of an attributes store 308, a template repository 310, and a user data cache 312. The attributes store 308 may store one or more attributes such as, for example, a client ID and a client secret. The communication between authentication management system 116 and the cloud-native IAM system 108 may be secured in compliance to the cloud-native authentication protocol, such as OAuth, using Client ID and Client secret. The Client ID and the Client Secret may represent OAuth-native credentials of the cloud-native IAM system 108 used for user authentication. In some examples, the template repository 310 may store an authentication relay request template that may be used by the processing resource to generate the authentication relay request. Additional information regarding usage of the attributes store 308 and the template repository 310 will be described in conjunction with FIG. 5.

Further, in some examples, the user data cache 312 may store user attributes extracted from a search result message received from the enterprise user directory server 118. Data stored in the user data cache 312 may be cleared once a user login session has expired. For example, if the user 106 is successfully authenticated to access the on-premise application 114, the processing resource 302 may perform a check to determine whether a login session of the user 106 for the on-premise application 114 has expired. In one example, the processing resource 302 may receive a login session expiry message from the on-premise application 114 when the user 106 logs-out of the on-premise application 114 or when the session is terminated due to any other reason (e.g., a network connectivity issue). If it is determined that the login session of the user 106 has not expired, the processing resource 302 may continue to determine whether the login session of the user 106 for the on-premise application 114 has expired. However, if it is determined that the login session of the user 106 has expired, the processing resource 302 may delete data stored in the user data cache 312.

Figure 4:
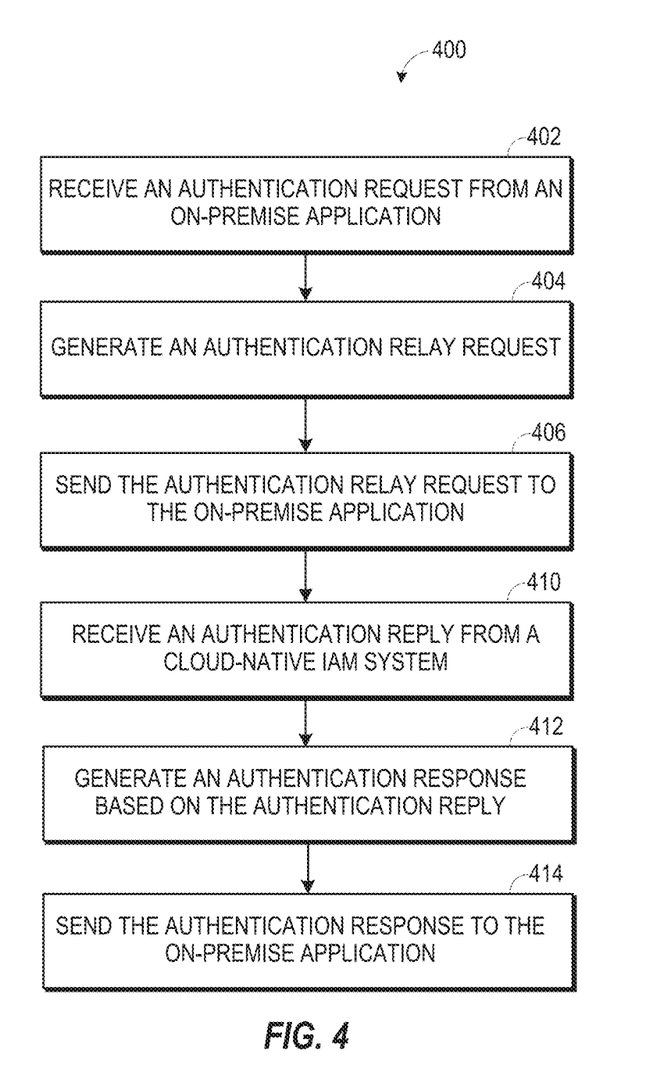
FIG. 4 is a flow diagram depicting a method for user authentication management between enterprise-level authentication protocol and cloud-native authentication protocol, in accordance with an example.

Moving now to FIG. 4, a flow diagram depicting a method 400 for user authentication management between enterprise-level authentication protocol and cloud-native authentication protocol. For illustration purposes, the method 400 will be described in conjunction with the networked system 100 of FIG. 1. The method 400 may include method blocks 402, 404, 406, 410, 412, and 414 (hereinafter collectively referred to as blocks 402-414), which may be performed by a processor-based system, for example, the authentication management system 116. In particular, operations at the method blocks 402-414 may be performed by the processing resource 302 of the authentication management system 116 by executing the instructions 306 stored in the machine-readable medium 304. Moreover, it is to be noted that in some examples, the order of execution of the blocks 406-414 may be different from the one shown in FIG. 4. For example, the blocks 402-414 may be performed in series, in parallel, or a series-parallel combination.

Prior to block 402, a user attempts to use cloud-native access credentials to access an on-premise application 114 that is hosted on the on-premise network 102. At block 402, the processing resource 302 of the authentication management system 116 may receive an authentication request (e.g., an authentication request described in syntax (1)) to authenticate the user 106 (e.g., a user with a username— bjensen@example.com) that is in compliance to an enterprise-level authentication protocol (e.g., LDAP) from the on-premise application 114. Further, at block 404, the processing resource 302 may generate an authentication relay request (e.g., an authentication relay request described in syntax (2)) that is formatted in compliance to the cloud-native authentication protocol (e.g., OAuth 2.0 protocol) based on the authentication request. Details of generating the authentication relay request are described in FIG. 5. The processing resource 302 may then send the authentication relay request to the cloud-native IAM system 108 at block 406.

In some examples, upon receipt of the authentication relay request the cloud-native IAM system 108 may generate an authentication reply (e.g., the authentication reply illustrated in syntax (4) or syntax (5)). As previously noted, the authentication reply may indicate whether the user 106 is successfully authenticated to access the application or not. For example, if the authentication reply indicates a successful authentication of the user 106, the authentication reply may include a status code indicating an authentication success (e.g., HTTP/1.1 200). However, if the authentication reply indicates an unsuccessful authentication of the user 106, the authentication reply may include a status code indicating an authentication failure (e.g., HTTP/1.1 400). At block 410, the authentication reply may be received by the authentication management system 116 from the cloud-native IAM system 108. Furthermore, in some examples, at block 412, the authentication management system 116 may generate an authentication response (e.g., the authentication response illustrated in syntax (6)) compliant with the enterprise-level authentication protocol (e.g., LDAP) based on the authentication reply received from the cloud-native IAM system 108. Details of generating the authentication response are described in FIG. 6. Moreover, at block 414, the authentication management system 116 may send the authentication response to the on-premise application 114.

Figure 5:
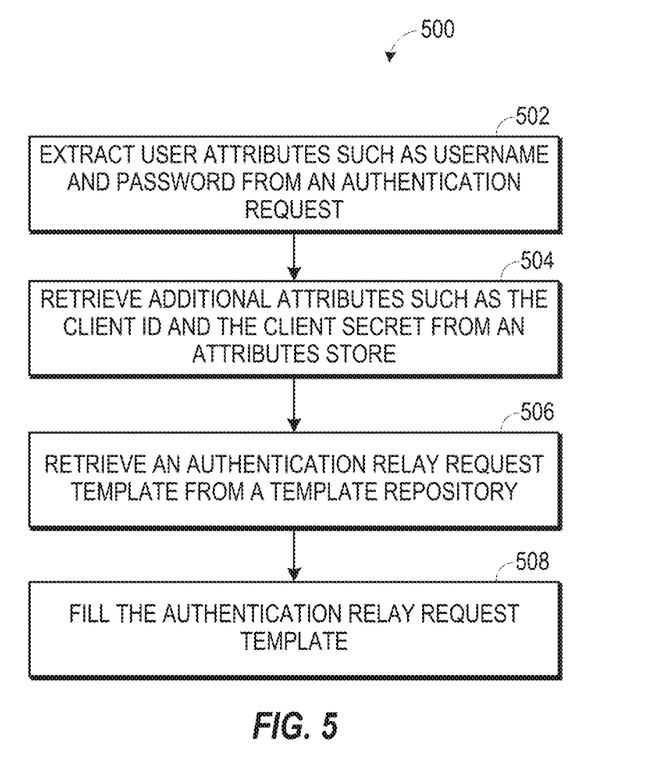
FIG. 5 is a flow diagram depicting a method for generating an authentication relay request based on an authentication request received from an application, in accordance with an example.

Turning to FIG. 5, a flow diagram depicting a method 500 for generating an authentication relay request is presented, in accordance with an example. In one example, the method 500 may include method blocks 502, 504, 506, and 508 to perform the operation at block 404 of the method 400 described in FIG. 4.

At block 502, the processing resource 302 may extract user attributes such as the username and password from the authentication request received from the on-premise application 114. In order to extract the username and password, the processing resource 302 may parse the authentication request to look for identifiers (i.e., LDAP Data Interchange Format (LDIF) fields) such as "cn" and "w" in the syntax (e.g., the syntax (2)) of the authentication request. The processing resource 302 may extract the value corresponding to the identifier "cn" as the username and the value corresponding to the identifier "w" as the password. Further, at block 504, the processing resource 302 may retrieve additional attributes such as the client ID and the client secret from the attributes store 308.

Further, at block 506, the processing resource 302 may retrieve an authentication relay request template from a template repository 310. An authentication relay request template compliant with the OAuth 2.0 may be represented using following syntax (7).

---
Syntax (7): Example authentication relay request template
---
```
{
"grant_type":"password",
"client_id":"< >", # OAuth Client App ID which will
be used to authenticate all users
"username":"< >",
"password":"< >",
"client secret ":"< >", # OAuth Client App secret which
will be used to authenticate all users
}
```
---

The authentication relay request template of syntax (7) includes one or more empty fields (e.g., fields represented via "< >" in the syntax (7)) corresponding to the identifiers such as "client_id," "username," "password," and "client_secret."

At block 508, the processing resource 302 may fill the authentication relay request template to generate the authentication relay request. For example, the information such as values of the identifiers "cn" and "w" extracted at block 502 may be filled into the empty fields corresponding to the identifiers "username" and "password," respectively. Further, information such as the client ID and the client secret retrieved at block 506 may be filled into the empty fields corresponding to the identifiers "client_id" and "client_secret." Once the empty fields are filled at the block 508, the authentication relay request such as the example authentication relay request represented by the syntax (3) may be generated by the authentication management system 116.

Figure 6:
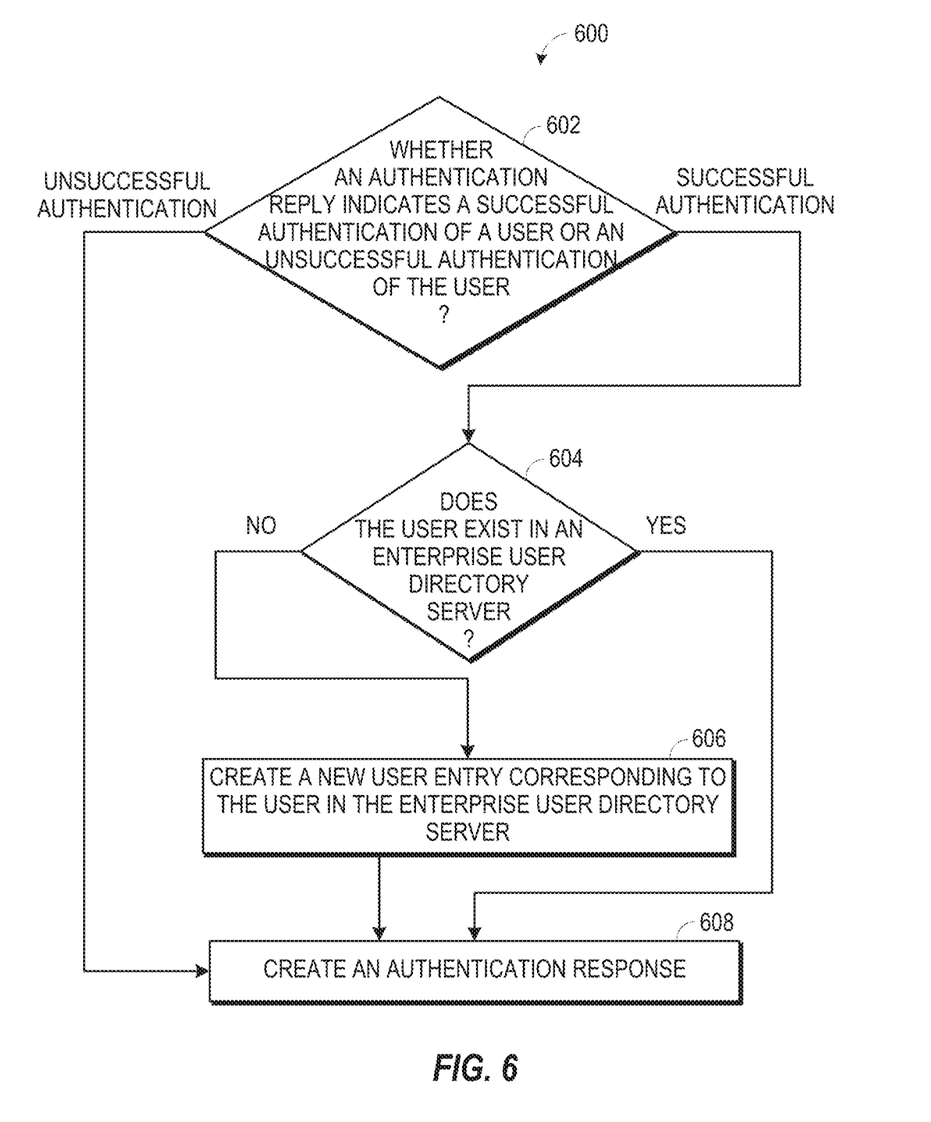
FIG. 6 is a flow diagram depicting a method for generating an authentication response to be sent to an application based on an authentication reply received from a cloud-native identity and authentication management system, in accordance with an example.

Referring now to FIG. 6, a flow diagram depicting a method 600 for generating the authentication response is depicted, in accordance with an example. In one example, the method 600 may include method blocks 602, 604, 606, and 608 to perform the operation at block 412 of the method 400 described in FIG. 4.

At block 602, the processing resource 302 may perform a check to determine whether the authentication reply received from the cloud-native IAM system 108 indicates a successful authentication of the user 106 or an unsuccessful authentication of the user 106 as per the cloud-native authentication protocol. In order to perform such check at the block 602, the processing resource 302 may verify the status code indicative of a status of the user authentication. If the status code contained in the authentication reply matches with a predefined success code (e.g., HTTP/1.1 200), the processing resource 302 may determine that the authentication reply indicates a successful authentication of the user 106. However, if the status code contained in the authentication reply matches with a predefined failure code (e.g., HTTP/1.1 400), the processing resource 302 may determine that the authentication reply indicates an unsuccessful or failed authentication of the user 106.

At block 602, if it is determined that the authentication reply indicates an unsuccessful or failed authentication of the user 106, the processing resource 302 may generate the authentication response as described at block 608 (described later). It is to be noted that if authentication reply indicates the unsuccessful or failed authentication of the user 106, a user entry corresponding to the user 106 may not be available or stored in the enterprise user directory server 118.

However, at block 602, if it is determined that the authentication reply indicates the successful authentication of the user 106, at block 604, the processing resource 302 may perform another check to determine whether the user 106 already exists in the enterprise user directory server 118. The processing resource 302 sends a search command (e.g., ldapsearch) to the enterprise user directory server 118 with one or more user attributes (e.g., the username—bjensen@example.com) to determine if a user entry corresponding to the user 106 exists in the enterprise user directory server 118.

If the user entry corresponding to the user 106 is found in the enterprise user directory server 118, the enterprise user directory server 118 may return a response to the authentication management system 116 including one or more user attributes about the user 106 stored in the enterprise user directory server 118 and the execution may proceed to block 608 (described later). In some examples, the processing resource 302 may store information regarding the one or more user attributes about the user 106 received from the enterprise user directory server 118 into the user data cache 312. However, if the user 106 is not found in the enterprise user directory server 118, the enterprise user directory server 118 may return a response to the authentication management system 116 indicating that the user 106 does not exist in the enterprise user directory server 118. The authentication management system 116 may determine whether the user 106 already exists in the enterprise user directory server 118 based on the response received from the enterprise user directory server 118.

If it is determined at block 604 that the user 106 does not exist in the enterprise user directory server 118, then at block 606 the authentication management system 116 may create a new user entry corresponding to the user 106 in the enterprise user directory server 118. Creating the new user entry may include creating attributes such as a user ID (UID) and a group ID (GID) compliant with LDAP. For example, the UID for the user 106 may be selected same as the username—bjensen@example.com and the GID may be 4590 (marked as gidNumber in the syntax (6)). In some examples, the UID and the GID of the user 106 may be stored in the enterprise user directory server 118 by the processing resource 302 when the user 106 attempts to access the on-premise application 114 for the first time. For subsequent attempts, the processing resource 302 may retrieve the information corresponding to the UID and the GID from the enterprise user directory server 118. In some examples, the processing resource 302 may also store information regarding UID and the GID in the user data cache 312.

Once the new user entry is created, the processing resource 302 may perform block 608 to create the authentication response. In one example, at block 608, the processing resource 302 may execute an LDAP search command (e.g., ldapsearch) on the enterprise user directory server 118. The LDAP search command may involve binding to the enterprise user directory server 118 before initiating the LDAP search operation with a certain scope from a given base distinguished name (DN). The LDAP search request initiated by the processing resource 302 may include a filter of attribute values that would match in the entries returned. The execution of the LDAP search command may open a connection between the authentication management system 116 and the enterprise user directory server 118 (e.g., LDAP server), bind to the enterprise user directory server 118, and perform a search using the filter.

When the enterprise user directory server 118 receives a valid, authorized LDAP search request, the enterprise user directory server 118 may identify any entries, if found, within the scope specified in the LDAP search request that match the given filter. In some instances, when the user entry matching the criteria is not stored in enterprise user directory server 118 and/or if the authentication reply indicates the unsuccessful or failed authentication of the user 106, the enterprise user directory server 118 may not find any entry stored therein. If the enterprise user directory server 118 finds user entries matching to the given filter, identified user entries (or at least those that the requester, e.g., the on-premise application 114, has permission to retrieve) will be returned to the authentication management system 116 in search result messages. If one or more user entries are found in the enterprise user directory server 118, a search result message may include the distinguished name (DN) of the matching user entry, along with one or more other user attributes, if any, in an LDAP Data Interchange Format (LDIF). The syntax (6) described hereinabove may represent an example search result message. In some examples, the processing resource 302 may store information (e.g., DN and other user attributes) extracted from the search result message into the user data cache.

In some examples, the authentication management system 116 may forward the search result message received from the enterprise user directory server 118 to the application 114 as the authentication response. Once the authentication response is received by the on-premise application 114 from the authentication management system 116, the on-premise application 114 may allow access to one or more features and/or services to the user 106 or may deny access to the user 106 based on the authentication response.

Figure 7:
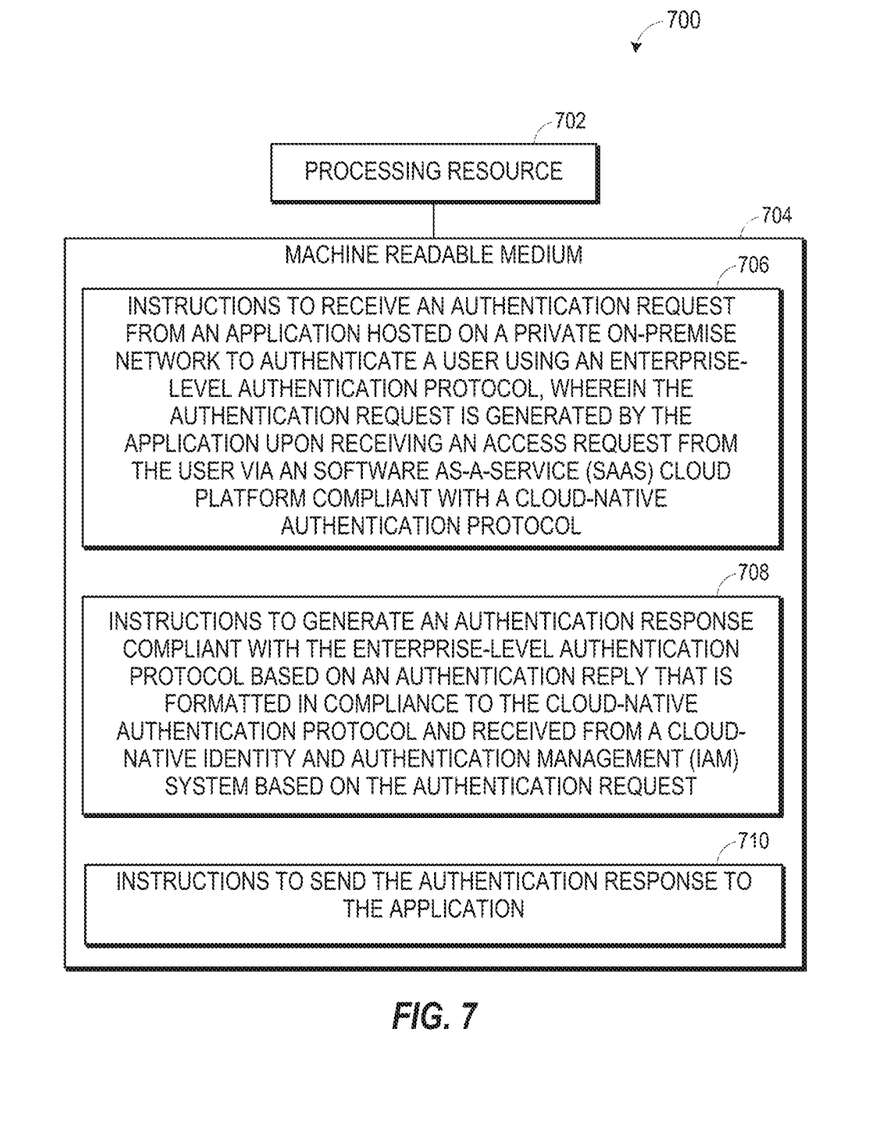
FIG. 7 is a block diagram depicting a processing resource and a machine-readable medium encoded with example instructions to manage an authentication of a user between enterprise-level authentication protocol and cloud-native authentication protocol, in accordance with an example.

FIG. 7 is a block diagram 700 depicting a processing resource 702 and a machine-readable medium 704 encoded with example instructions to facilitate enhanced deployment of workloads, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 302 of the authentication management system 116. Further, the machine-readable medium 704 may represent one example of the machine-readable medium 304 of the authentication management system 116.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706, 708, and 710 (hereinafter collectively referred to as instructions 706-710) to manage authentication of the user 106 attempting to access the on-premise application 114 via a SaaS cloud platform 104, wherein the on-premise application 114 is accessible using the enterprise-level authentication protocol. Although not shown, in some examples, the machine-readable medium 704 may be encoded with certain additional executable instructions to perform the methods 400, 500, and 600 described in FIGS. 4-6, and/or any other operations performed by the authentication management system 116, without limiting the scope of the present disclosure.

The processing resource 702 may be a physical device, for example, one or more CPU, one or more semiconductor-based microprocessor, one or more GPU, ASIC, FPGA, other hardware devices capable of retrieving and executing the instructions 706-710 stored in the machine-readable medium 704, or combinations thereof. In some examples, the processing resource 702 may fetch, decode, and execute the instructions 706-710 stored in the machine-readable medium 704 to manage authentication of the user 106. In certain examples, as an alternative or in addition to retrieving and executing the instructions 706-710, the processing resource 702 may include at least one integrated circuit, other control logic, other electronic circuits, or combinations thereof that include a number of electronic components for performing the functionalities intended to be performed by the authentication management system 116.

The instructions 706 when executed by the processing resource 702 may cause the processing resource 702 to receive an authentication request from the on-premise application 114 hosted on the on-premise network 102 to authenticate the user 106 using the enterprise-level authentication protocol (e.g., LDAP). As previously illustrated, the authentication request is generated by the on-premise application 114 upon receiving an access request from the user 106 via the SaaS cloud platform 104 in the cloud-native authentication protocol (e.g., OAuth 2.0 protocol). Further, the instructions 708 when executed by the processing resource 702 may cause the processing resource 702 to generate an authentication response compliant with the enterprise-level authentication protocol based on an authentication reply that is compliant with the cloud-native authentication protocol and received from a cloud-native IAM system 108. Moreover, the instructions 710 when executed by the processing resource 702 may cause the processing resource 702 to send the authentication response to the on-premise application 114.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. An authentication management system comprising:
a processor; and
a non-transitory machine-readable medium storing instructions that, when executed by the processor, cause the processor to:
receive an authentication request from an application hosted on a private on-premise network to authenticate a user using an enterprise-level authentication protocol, wherein the authentication request is generated by the application upon receiving an access request from the user via a software as-a-service (SaaS) cloud platform in a cloud-native authentication protocol;
create a new user entry corresponding to the user in an enterprise user directory server hosted in the private on-premise network in response to determining that the user is successfully authenticated and the user does not exist in the enterprise user directory server:
generate, based on the new user entry, an authentication response compliant with the enterprise-level authentication protocol based on an authentication reply that is formatted in compliance to the cloud-native authentication protocol and received from a cloud-native identity and authentication management (IAM) system based on the authentication request; and
send the authentication response to the application.

2. The authentication management system of claim 1, wherein the enterprise-level authentication protocol is a Lightweight Directory Access Protocol (LDAP), and wherein the cloud-native authentication protocol is Open Authorization (OAuth) protocol or OpenID Connect (OIDC) protocol.

3. The authentication management system of claim 1, wherein the application is accessed using the enterprise-level authentication protocol.

4. The authentication management system of claim 3, wherein the application is accessed by the user via a container management platform hosted on the private on-premise network using cloud-native access credentials synchronized with the cloud-native IAM system, and wherein the container management platform is accessed from the SaaS cloud platform using a single-sign-on (SSO) based authentication, and wherein the SaaS cloud platform is accessed using the cloud-native access credentials.

5. The authentication management system of claim 1, wherein the SaaS cloud platform allows the user to access to access the private on-premise network in a pay-per-use model.

6. The authentication management system of claim 1, wherein the processor executes one or more of the instructions to:
generate an authentication relay request compliant with the cloud-native authentication protocol based on the authentication request; and
send the authentication relay request to the cloud-native IAM system.

7. The authentication management system of claim 6, wherein the authentication reply indicates a successful authentication of the user or an unsuccessful authentication of the user in compliance to the cloud-native authentication protocol.

8. The authentication management system of claim 7, wherein to generate the authentication response the processor executes one or more of the instructions to:
determine whether the user already exists in the enterprise user directory server in response to determining that the authentication response indicates the successful authentication of the user.

9. The authentication management system of claim 8, wherein the new user entry comprises a user ID (UID) and a group ID (GID).

10. The authentication management system of claim 8, wherein the processor executes one or more of the instructions to create, in response to determining that the user exists in the enterprise user directory server, the authentication response based on user attributes corresponding to the user already stored in the enterprise user directory server.

11. The authentication management system of claim 1, wherein the application allows the user to perform one or more machine learning operations.

12. A method comprising:
receiving, by a processor-based system, an authentication request from an application hosted on a private on-premise network to authenticate a user using a Lightweight Directory Access Protocol (LDAP), wherein the authentication request is generated by the application upon receiving an access request from the user via a software as-a-service (SaaS) cloud platform in an Open Authorization (OAuth) protocol;
creating a new user entry corresponding to the user in an enterprise user directory server hosted in the private on-premise network in response to determining that the user is successfully authenticated and the user does not exist in the enterprise user directory server;
generating, by the processor-based system based on the new user entry, an authentication response compliant with LDAP based on an authentication reply that is formatted in compliance to the OAuth protocol and received from a cloud-native identity and authentication management (IAM) system based on the authentication request; and
sending, by the processor-based system, the authentication response to the application.

13. The method of claim 12, wherein the application is accessed by the user via a container management platform hosted on the private on-premise network using cloud-native access credentials synchronized with the cloud-native IAM system, and wherein the container management platform is accessed from the SaaS cloud platform using a single-sign-on (SSO) based authentication, and wherein the SaaS cloud platform is accessed using the cloud-native access credentials.

14. The method of claim 12, further comprising:
generating an authentication relay request compliant with the OAuth protocol based on the authentication request; and
sending the authentication relay request to the cloud-native IAM system.

15. The method of claim 14, wherein generating the authentication response comprises:
determining whether the authentication response indicates a successful authentication of the user or an unsuccessful authentication of the user; and
in response to determining that the authentication response indicates the successful authentication of the user, determining whether the user already exists in the enterprise user directory server.

16. A non-transitory machine-readable medium storing instructions executable by a processor, the instructions comprising:

instructions to receive an authentication request from an application hosted on a private on-premise network to authenticate a user using an enterprise-level authentication protocol, wherein the authentication request is generated by the application upon receiving an access request from the user via a software as-a-service (Saas) cloud platform in a cloud-native authentication protocol;

instructions to create a new user entry corresponding to the user in an enterprise user directory server hosted in the private on-premise network in response to determining that the user is successfully authenticated and the user does not exist in the enterprise user directory server:

instructions to generate, based on the new user entry, an authentication response compliant with the enterprise-level authentication protocol based on an authentication reply that is formatted in compliance to the cloud-native authentication protocol and received from a cloud-native identity and authentication management (IAM) system based on the authentication request; and instructions to send the authentication response to the application.

17. The non-transitory machine-readable medium of claim 16, wherein the application is accessed by the user via a container management platform hosted on the private on-premise network using cloud-native access credentials synchronized with the cloud-native IAM system, and wherein the container management platform is accessed from the SaaS cloud platform using a single-sign-on (SSO) based authentication, and wherein the SaaS cloud platform is accessed using the cloud-native access credentials.

18. The non-transitory machine-readable medium of claim 16, wherein the instructions further comprising:

instructions to generate an authentication relay request compliant with the cloud-native authentication protocol based on the authentication request; and instructions to send the authentication relay request to the cloud-native IAM system.

19. The non-transitory machine-readable medium of claim 18, wherein the instructions to generate the authentication response comprises:

instructions to determine whether the authentication response indicates a successful authentication of the user or an unsuccessful authentication of the user; and instructions to determine, in response to determining that the authentication response indicates the successful authentication of the user, whether the user already exists in the enterprise user directory server.

20. The non-transitory machine-readable medium of claim 19, wherein the instructions to generate the authentication response comprises instructions to create, in response to determining that the user exists in the enterprise user directory server, the authentication response based on user attribute corresponding to the user already stored in the enterprise user directory server.

* * * * *